US009841277B2

(12) United States Patent
Myers et al.

(10) Patent No.: US 9,841,277 B2
(45) Date of Patent: Dec. 12, 2017

(54) GRAPHICAL FEEDBACK DURING 3D SCANNING OPERATIONS FOR OBTAINING OPTIMAL SCAN RESOLUTION

(71) Applicants: Stephen Brooks Myers, Shreve, OH (US); Jacob Abraham Kuttothara, Loudonville, OH (US); Steven Donald Paddock, Richfield, OH (US); John Moore Wathen, Akron, OH (US); Andrew Slatton, Columbus, OH (US)

(72) Inventors: Stephen Brooks Myers, Shreve, OH (US); Jacob Abraham Kuttothara, Loudonville, OH (US); Steven Donald Paddock, Richfield, OH (US); John Moore Wathen, Akron, OH (US); Andrew Slatton, Columbus, OH (US)

(73) Assignee: Knockout Concepts, LLC, Columbus, OH (US)

( * ) Notice: Subject to any disclaimer, the term of this patent is extended or adjusted under 35 U.S.C. 154(b) by 232 days.

(21) Appl. No.: 14/672,048

(22) Filed: Mar. 27, 2015

(65) Prior Publication Data
US 2015/0276392 A1      Oct. 1, 2015

Related U.S. Application Data

(60) Provisional application No. 61/971,036, filed on Mar. 27, 2014.

(51) Int. Cl.
*G01B 11/26* (2006.01)
*G06F 17/15* (2006.01)
(Continued)

(52) U.S. Cl.
CPC .............. *G01B 11/26* (2013.01); *G06F 17/15* (2013.01); *G06K 9/00201* (2013.01);
(Continued)

(58) Field of Classification Search
None
See application file for complete search history.

(56) References Cited

U.S. PATENT DOCUMENTS 7,043,290 B2   5/2006  Young et al.
8,031,909 B2  10/2011  Se et al.
(Continued)

OTHER PUBLICATIONS

3D Point Cloud Segmentation, Poudel, Dev Bahadur, Internet publication, Jan. 2, 2013.
(Continued)

*Primary Examiner* — Eileen Adams
(74) *Attorney, Agent, or Firm* — Frisina LLC

(57) ABSTRACT

This application teaches a method for indicating voxel quality comprising graphically and/or mathematically. Such a method may include measuring a distance from the three-dimensional scanning device to an area of a subject corresponding to an image voxel. It may also include measuring an angle between a line of sight from the three-dimensional imaging device and an orthogonal ray of the same area of the subject corresponding to the same voxel. The process may further include comparing the measured distance and angle to known acceptable operating ranges of the scanner, and plotting a quality point corresponding to the foregoing metrics on a set of axes.

19 Claims, 4 Drawing Sheets

(51) Int. Cl.
*G06T 17/00* (2006.01)
*G06T 13/20* (2011.01)
*G06K 9/46* (2006.01)
*G06T 15/20* (2011.01)
*G06T 17/10* (2006.01)
*G06T 19/20* (2011.01)
*G06T 7/00* (2017.01)
*G06K 9/00* (2006.01)
*G06K 9/03* (2006.01)

(52) U.S. Cl.
CPC ............ *G06K 9/036* (2013.01); *G06K 9/4604* (2013.01); *G06T 7/0002* (2013.01); *G06T 13/20* (2013.01); *G06T 15/20* (2013.01); *G06T 17/00* (2013.01); *G06T 17/10* (2013.01); *G06T 19/20* (2013.01); *G06K 2209/40* (2013.01); *G06T 2207/10016* (2013.01); *G06T 2207/10028* (2013.01); *G06T 2207/30168* (2013.01)

(56) References Cited

U.S. PATENT DOCUMENTS

| | | |
|---|---|---|
| 2009/0059241 A1 | 5/2009 | Lapa et al. |
| 2011/0249780 A1* | 10/2011 | Mollfulleda San Julian ................... H04L 27/2613 375/354 |
| 2012/0127174 A1* | 5/2012 | Naidu .................. G06T 11/001 345/419 |
| 2013/0004047 A1* | 1/2013 | Shiki .................. G01S 7/52033 382/131 |
| 2013/0335417 A1* | 12/2013 | McQueston ........... A61B 6/145 345/424 |
| 2014/0050367 A1 | 2/2014 | Chen et al. |
| 2015/0022639 A1 | 1/2015 | Blassnig et al. |
| 2015/0070468 A1 | 3/2015 | Pfeffer |

OTHER PUBLICATIONS

Kreveld et al., On the Shape of a Set of Points and Lines in the Plane, Eurographics Symposium on Geometry Processing, vol. 30, No. 5 (2011).

Dey et al., Voronoi-based Feature Curve Extraction for Sampled Singular Surfaces, Internet publication, May 30, 2013.

Belongie et al., Shape Matching and Object Recognition Using Shape Contexts, IEE Transactions on Pattern Analysis and Machine Intelligence, vol. 24, No. 24, Apr. 2002.

Shalom et al., Part Analogies in Sets of Objects, Eurographics Workshop on 3D Object Retrieval (2008).

* cited by examiner

GRAPHICAL FEEDBACK DURING 3D SCANNING OPERATIONS FOR OBTAINING OPTIMAL SCAN RESOLUTION

I. BACKGROUND OF THE INVENTION

A. Field of Invention

Embodiments may generally relate to assessing the optical quality of digital scanning data.

B. Description of the Related Art

It is known that optical scanning devices, including those operating in the visible spectrum as well as other parts of the electromagnetic spectrum, are suitably operational within certain limits. For instance, a given device may have an optimal focal length and a characteristic depth-of-field wherein the best-quality data can be collected. Data collected outside of that range will generally be of lesser quality in terms of focus and/or resolution. Similarly, the angle at which data is collected relative to surface normal of the subject can effect image quality. What is needed is a way of collecting and/or displaying image quality metrics so that a user can make decisions regarding suitable parameters for data collection, such as camera positioning.

Some embodiments of the present invention may provide one or more benefits or advantages over the prior art.

II. SUMMARY OF THE INVENTION

Some embodiments may relate to a method for indicating voxel resolution quality comprising the steps of: measuring a distance from the three-dimensional scanning device to an area of a subject corresponding to at least one image voxel; measuring an angle between a line of sight from the three-dimensional imaging device to an orthogonal ray of the area of the subject corresponding to the at least one voxel; comparing the measured distance to a known acceptable operating distance range of the three-dimensional scanning device; comparing the measured angle to a known acceptable operating distance range of the three-dimensional scanning device; and plotting a quality point on a set of axes.

According to some embodiments the coordinates of the quality point are the measured distance and the measured angle.

According to some embodiments the measured distance defines a two-dimensional point on a distance axis, the measured angle defines a two-dimensional point on an angle axis, and the quality point is the average of the coordinates of the two-dimensional distance point and the two-dimensional angle point.

Embodiments may further comprise the step of acquiring the at least one image voxel of the subject with the three-dimensional scanning device.

Embodiments may further comprise the step of displaying the quality point and the axes on a display screen of the three-dimensional scanning device.

According to some embodiments the quality point is displayed in real time.

According to some embodiments the axes are normalized.

According to some embodiments the axes are normalized such that a zero value is optimal, and where the maximum acceptable value is 1 and the minimum acceptable value is −1.

According to some embodiments at least one color is assigned to each axis of the set of axes.

According to some embodiments the at least one color of each axis each defines a gradient spanning from an origin to maximum or minimum limits of each quadrant.

According to some embodiments each gradient is a linear gradient.

According to some embodiments each gradient is such that each point in a space defined by the set of axes has a unique color value.

Embodiments may further comprise the step of assigning a quality point to each voxel of a three-dimensional model acquired with the three-dimensional imaging device.

Embodiments may further comprise the step of assigning a color value to a plurality of voxels of the three-dimensional model, the color value corresponding to the quality point, and displaying the plurality of voxels in their assigned colors.

According to some embodiments the plurality of voxels define at least a portion of a reconstructed model.

Embodiments may relate to a method for indicating voxel resolution quality comprising the steps of: measuring a distance from the three-dimensional scanning device to an area of a subject corresponding to at least one image voxel; measuring an angle between a line of sight from the three-dimensional imaging device to an orthogonal ray of the area of the subject corresponding to the at least one voxel; comparing the measured distance to a known acceptable operating distance range of the three-dimensional scanning device; comparing the measured angle to a known acceptable operating distance range of the three-dimensional scanning device; plotting a quality point on a set of axes, wherein the axes are normalized such that a zero value is optimal, and a maximum acceptable value is 1 and a minimum acceptable value is −1, and wherein at least one color is assigned to each axis of the set of axes, each color defining a linear gradient spanning from an origin to maximum or minimum limits of each quadrant, and wherein each gradient is such that each point in a space defined by the set of axes has a unique color value; and displaying the quality point and the axes on a display screen of the three-dimensional scanning device, wherein the quality point is displayed in real time.

Embodiments may relate to a method for indicating voxel resolution quality comprising the steps of: measuring a distance from the three-dimensional scanning device to an area of a subject corresponding to at least one image voxel; measuring an angle between a line of sight from the three-dimensional imaging device to an orthogonal ray of the area of the subject corresponding to the at least one voxel; comparing the measured distance to a known acceptable operating distance range of the three-dimensional scanning device; comparing the measured angle to a known acceptable operating distance range of the three-dimensional scanning device; plotting a quality point on a set of axes; assigning a quality point to each voxel of a three-dimensional model acquired with the three-dimensional imaging device; and assigning a color value to a plurality of voxels of the three-dimensional model, the color value corresponding to the quality point, and displaying the plurality of voxels in their assigned colors, wherein the plurality of voxels define at least a portion of a reconstructed 3D model.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Some embodiments described herein relate to methodologies and devices for indicating resolution quality of three dimensional (3D) scans. Embodiments may further relate to obtaining an image of a three dimensional subject with the help of 3D cameras, scanners, or various other suitable devices now known or developed in the future. A quality metric may include measuring the distance between the scanning device and a specific area of the real life three-dimensional subject corresponding to a voxel or a group of voxels of a 3D model. Another quality metric may include an angle between a line of sight of the scanner relative and an orthogonal ray of the area of the subject. Herein, the term 'voxel' is understood in the same sense as generally understood in the relevant industry, i.e. a unit of graphic information that defines any point of an object in three dimensional space. The measured distance may be compared to a known acceptable operating distance range of the 3D scanning device, and the angle may similarly be compared to a known acceptable operating distance range of the three-dimensional scanning device. These metrics may then be used to judge the quality of 3D scan data by, for example, plotting points representing the metrics on a set of axes and providing them to the user as graphical feedback.

Figure 1:
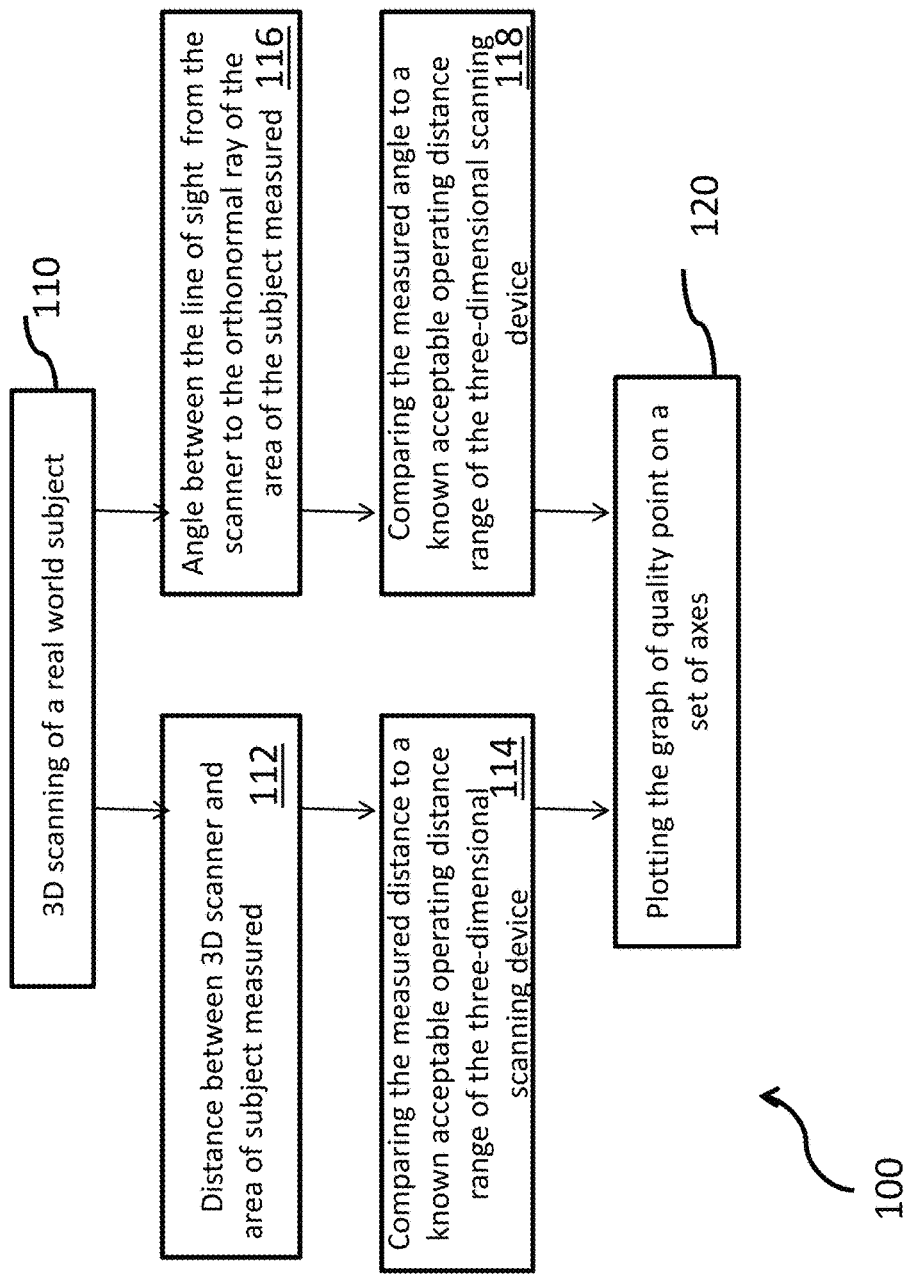
FIG. 1 is a flow diagram illustrating a process according to one embodiment of the invention.

Referring now to the drawings wherein the showings are for purposes of illustrating embodiments of the invention only and not for purposes of limiting the same, FIG. 1 depicts a flow diagram 100 of an illustrative embodiment wherein a 3D scan of a real world subject is carried out 110. In one embodiment, at least one image voxel corresponding to an area of the subject is acquired with the three-dimensional scanning device. The distance between the 3D scanner and the area of the subject is measured 112. This area of the subject may correspond to at least one image voxel. The measured distance may be compared to a known acceptable operating distance range of the three-dimensional scanning device 114. The measured distance may be converted to a two-dimensional point on a distance axis where one coordinate is the measured distance and the other coordinate is zero. Metrics and quality points may be plotted according to any method convenient for a two-dimensional display such as polar coordinate system or a Cartesian coordinate system.

Similarly, an angle between a line of sight of the scanner and the orthogonal ray of an area of the subject may be measured 116, and the area of the subject may similarly correspond to the same image voxel or voxels. Similar to the distance metric, the measured angle may be converted to a two-dimensional point on an angle axis and may be compared to a known acceptable operating range of the three dimensional scanning device 118. More specifically, one coordinate of the two dimensional point may be an angle expressed in any convenient form (e.g. degrees, radians, etc.), and the other coordinate may be zero.

After acquiring the quality metric data, the quality of the particular point may plotted on a set of axes 120. In an illustrative embodiment, the coordinates of the quality point are a measured distance metric and a measured angle metric as previously described herein. In some embodiments, a quality point may be defined as an average of each quality metric point. For instance, in the present example, a quality point may be expressed as an average of the coordinates of the two-dimensional distance point and the two-dimensional angle point. An example of this calculation is shown in eq. 1, where a quality point $Q_{d,a}$ is shown as being equal to the average <d,a> of a two-dimensional distance metric $(1, 0)_d$ and angle metric $(0,1)_a$. Accordingly, the average is (0.5, 0.5). In this example, the units of distance and angle are arbitrary, and for convenience and ease of explanation the numerical value of each point is set to one. Importantly, the quality point $Q_{d,a}$ corresponds to as little as a single voxel, but may correspond to a plurality of contiguous voxels.

$$Q_{d,a} = <d,a> = [(1,0)_d + (0,1)_a]/2 = (0.5, 0.5) \qquad \text{eq. 1}$$

In another embodiment, a quality point may be defined as a simple sum, rather than an average, of a plurality of metrics. For example, a two-dimensional quality point having distance and angle as its components, may be defined as shown in eq. 2.

$$Q_{d,a} = (d,a) = (1,0)_d + (0,1)_a = (1.0, 1.0) \qquad \text{eq. 2}$$

In still another embodiment where a polar coordinate system is used rather than a Cartesian coordinate system a quality point can be calculated according to eq. 3 or eq. 4. According to equation 3 a quality point $Q_{\alpha,\beta}$ can be calculated either as sum the magnitudes of quality metrics $\alpha$ and $\beta$, or as an average of their magnitudes. Similarly the angle for a quality point may be an average $\theta$ or a sum of each $\theta$, where $\theta$ indicates the arbitrary angle describing an axis, e.g. zero or $$\frac{\pi}{2}$$

where the axes are orthogonal.

$$Q_{\alpha,\beta} = [(\alpha,\theta_\alpha)_\alpha + (\beta,\theta_\beta)_\beta]/2 \qquad \text{eq. 3}$$

$$Q_{\alpha,\beta} = (\alpha,\theta_\alpha)_\alpha + (\beta,\theta_\beta)_\beta \qquad \text{eq. 4}$$

According to some embodiments each voxel of a three-dimensional model of a real world subject may be assigned a quality point. Quality feedback may be made more user friendly by assigning at least one color to each axis, wherein each color may define a gradient spanning limits of their respective axes radiating outward from the origin. For instance, a distance axis may be assigned the color yellow, and the gradient may start at the origin as pure white becoming more and more saturated with yellow until reaching a limit of pure yellow. Furthermore, the identical gradient may extend in the positive and the negative direction from the origin. Plotted in this way, every point in any quadrant (or quadrant equivalent in higher dimensions) can have a unique color.

According to some embodiments the gradient may be linear, but non-linear gradients, such as logarithmic gradients, may also be acceptable depending on the nature of the data being plotted. The quality point and the axes (with or without color gradient) may be displayed on the display screen of the three-dimensional scanning device wherein the quality point may optionally be displayed in real time. In some embodiments, the axes may be normalized to further simplify reading and understanding the quality point. For instance, one illustrative manner of normalization may include a zero value as optimal, 1 as the maximum acceptable value and −1 as the minimum acceptable value.

Figure 2:
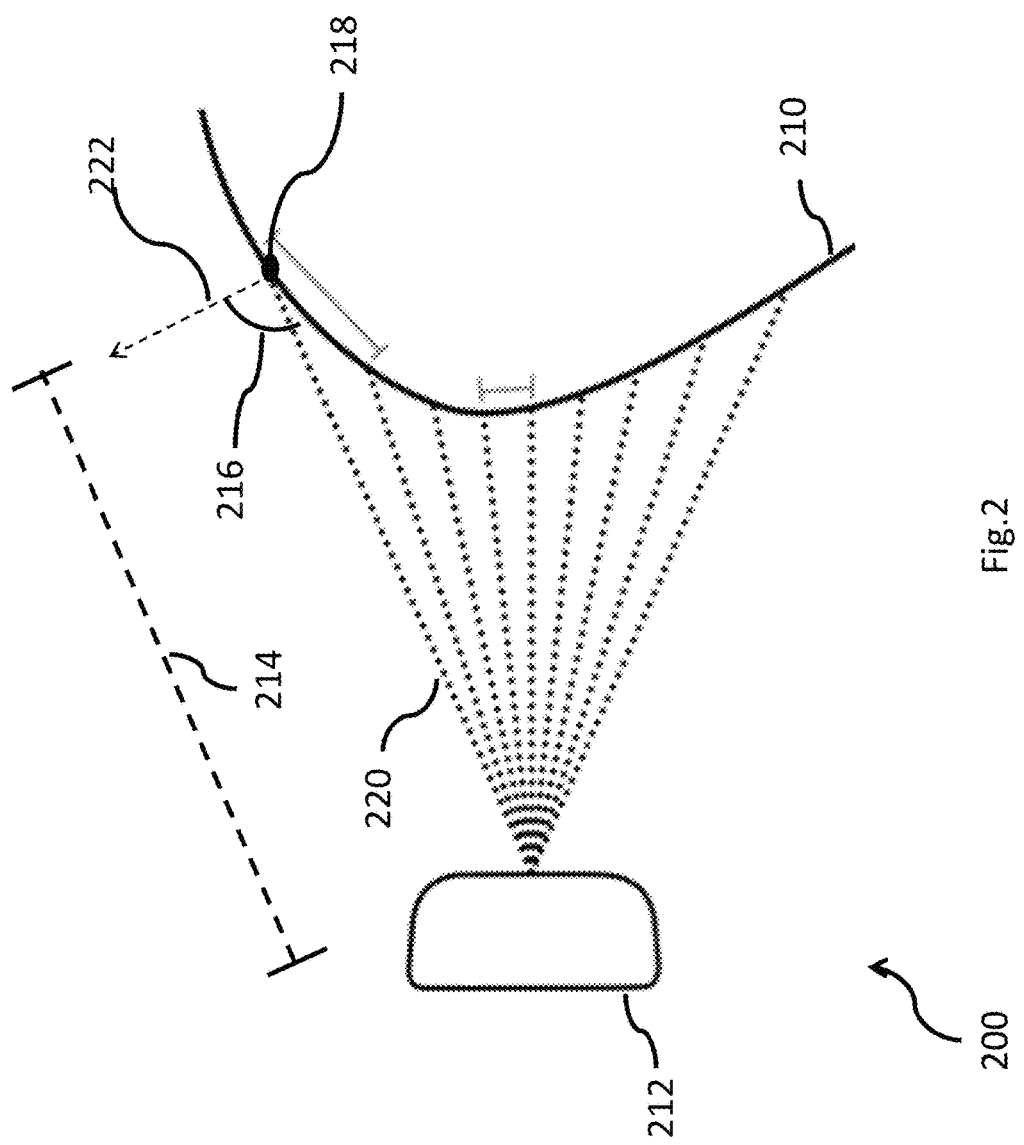
FIG. 2 is an illustration of an optical arrangement for collecting quality metrics.

FIG. 2 depicts an illustrative embodiment wherein a 3D scanning device 212 is used to scan the surface 210 of a real world subject. In one embodiment, during the scan at least one image voxel is acquired corresponding to an area of the subject. During the scan, the distance 214 between the 3D scanning device 212 and an area 218 on the surface 210 of the subject is measured. The area 218 on the surface 210 of the subject may correspond to at least one image voxel of the surface three-dimensional model. In one embodiment, the measured distance may be defined as a two-dimensional point on a distance axis. The distance 214 measured may be compared to a known acceptable operating distance range of the three-dimensional scanning device 212. Likewise, the angle 216 is measured between a line of sight 220 of the three-dimensional imaging device 212 and an orthogonal ray 222 of the area of the subject 218. As previously described herein the measured angle may be defined as a two-dimensional point on the angle axis, and may be compared to a known acceptable operating range of the three-dimensional scanning device 212. Similar scanning operations and quality metric collection may be carried out for every voxel of a three-dimensional model.

Figure 3:
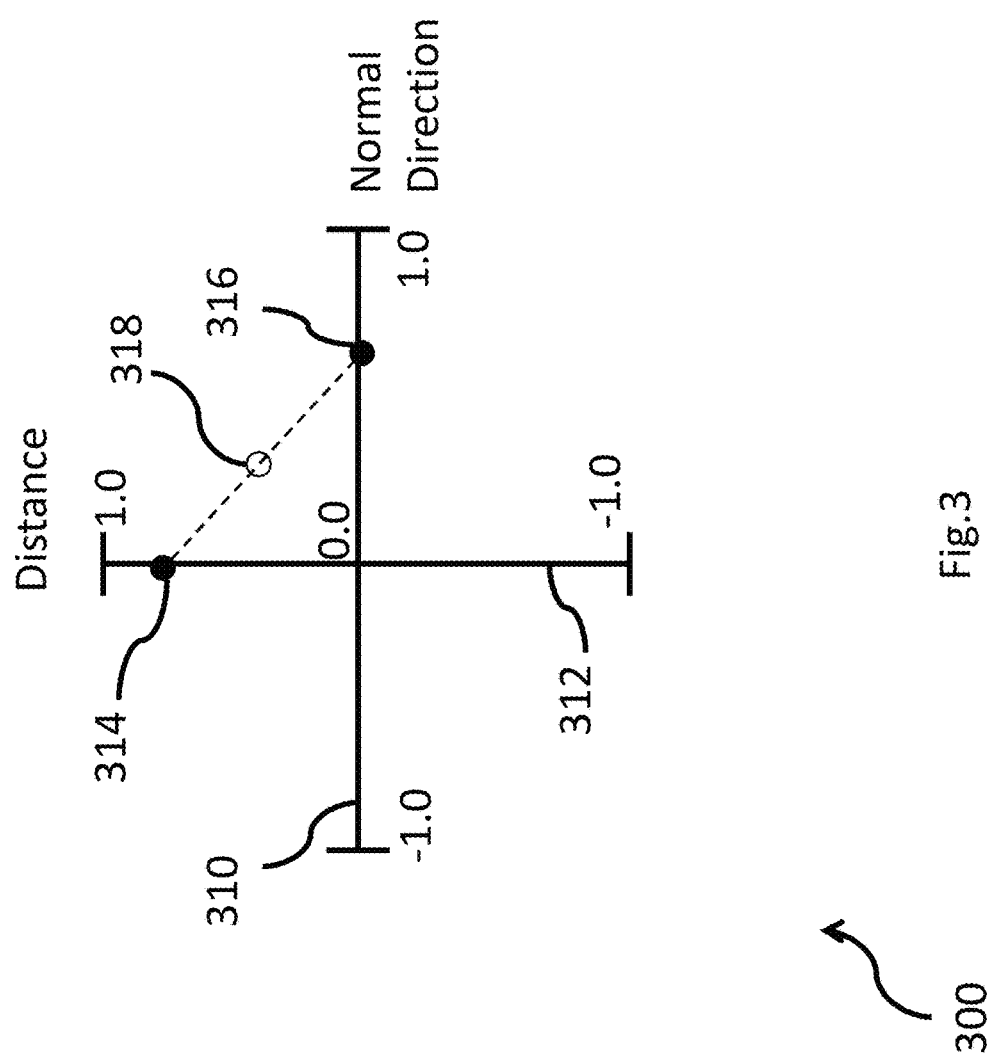
FIG. 3 is an illustration of a normalized graphical representation of a quality point.

FIG. 3 depicts an illustrative embodiment wherein a quality points is obtained according to eq. 1 herein, and is plotted on normalized distance and angle axes. The X-axis 310 corresponds to the measured angle and the Y-axis 312 corresponds to the measured distance. The quality point 318 is the average of the measured distance point 314 and the measured angle point 316.

Figure 4:
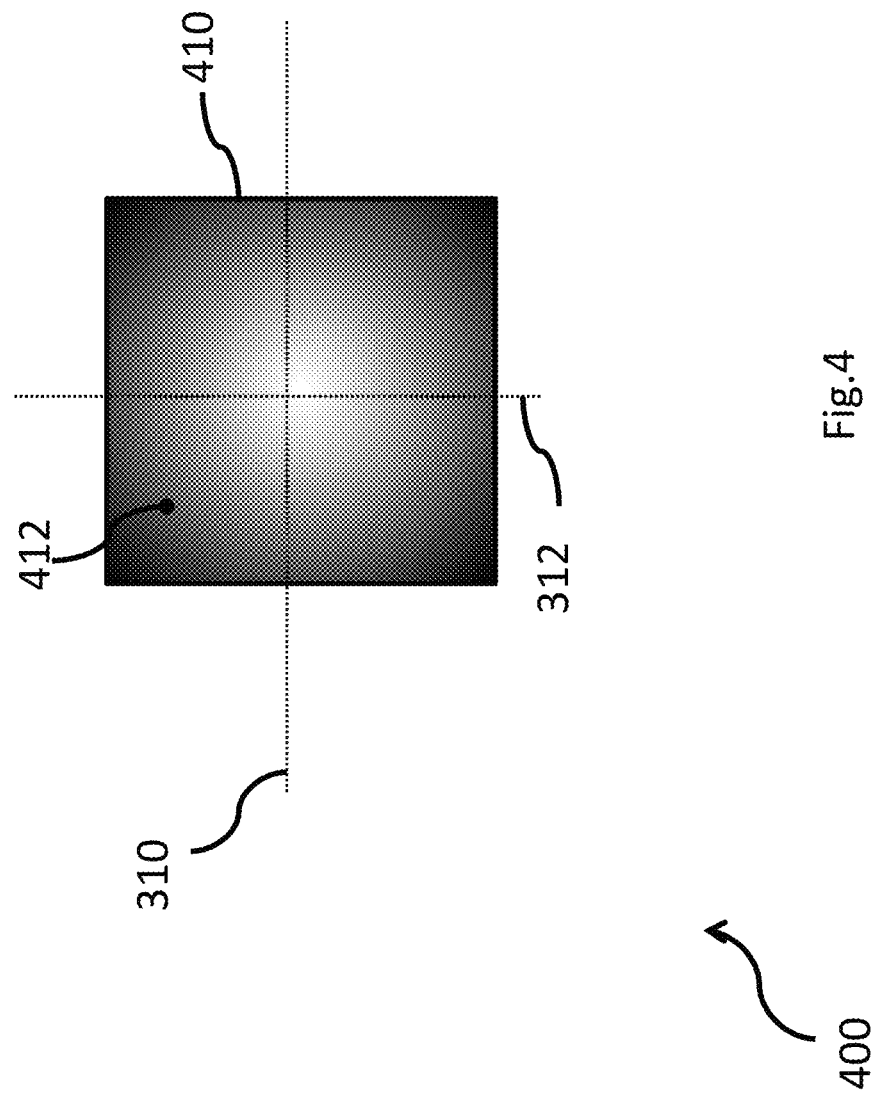
FIG. 4 is an illustration of an embodiment using a color-coded quality metric.

FIG. 4. depicts an illustrative embodiment incorporating a color indicator showing the quality of a given voxel in the form of a color-coded quality point 412. In this example 400 the limits of acceptable quality are within the colored region 410, where the origin is optimal quality, and quality diminishes as you move away from the origin. The gradient in this example is linear and due to the limitations of acceptable patent application formatting, it is shown in monochrome; however, one will appreciate that each axis may be assigned different colors rather than the same color. Thus, the x-axis 310 may be assigned one color, and the y-axis 312 may be assigned another. The graphical representation of quality shown here 400 may be displayed to a user, for instance, on a display screen of a 3D scanning device, and may be stored with a 3D model for later reference. For example, a user may review collected data, and in doing so may refer to quality points ($Q_{d,a}$) associated with selected voxels. This may be especially valuable in determining which, if any, voxels must be rescanned.

Given the foregoing methods of representing voxel quality and given that three-dimensional model data is being collected, it will be understood that one may produce a composite rendering of a scanned subject wherein a three-dimensional model is scanned and reconstructed according to known methods, and the voxels of the reconstructed image are colored with a color corresponding to the voxels' quality point rather than the actual color of the real subject. Accordingly, one may visually represent areas of a three-dimensional model that are better in quality, and those which are lesser in quality. At a glance one may see which voxels, if any, should be rescanned, edited, or otherwise improved.

It will be apparent to those skilled in the art that the above methods and apparatuses may be changed or modified without departing from the general scope of the invention. The invention is intended to include all such modifications and alterations insofar as they come within the scope of the appended claims or the equivalents thereof.

Having thus described the invention, it is now claimed:

1. A method for indicating voxel resolution quality comprising the steps of:
   measuring a distance from the three-dimensional scanning device to an area of a subject corresponding to at least one image voxel;
   measuring an angle between a line of sight of the three-dimensional imaging device and an orthogonal ray of the area of the subject corresponding to the at least one voxel;
   comparing the measured distance to a known acceptable operating distance range of the three-dimensional scanning device;
   comparing the measured angle to a known acceptable operating angle range of the three-dimensional scanning device; and
   plotting a quality point on a set of axes, wherein the coordinates of the quality point comprise the measured distance and the measured angle.

2. The method of claim 1, wherein the measured distance defines a two-dimensional point on a distance axis, the measured angle defines a two-dimensional point on an angle axis, and the quality point is the average of the coordinates of the two-dimensional distance point and the two-dimensional angle point.

3. The method of claim 1, further comprising the step of acquiring the at least one image voxel of the subject with the three-dimensional scanning device.

4. The method of claim 1, further comprising the step of displaying the quality point and the axes on a display screen of the three-dimensional scanning device.

5. The method of claim 4, wherein the quality point is displayed in real time.

6. The method of claim 1, wherein the axes are normalized.

7. The method of claim 6, wherein the axes are normalized such that a zero value is optimal, and where the maximum acceptable value is 1 and the minimum acceptable value is −1.

8. The method of claim 1, wherein at least one color is assigned to each axis of the set of axes.

9. The method of claim 8, wherein the at least one color of each axis each defines a gradient spanning from an origin to maximum or minimum limits of each quadrant.

10. The method of claim 9, wherein each gradient is a linear gradient.

11. The method of claim 9, wherein each gradient is such that each point in a space defined by the set of axes has a unique color value.

12. The method of claim 9 further comprising the step of assigning a quality point to each voxel of a three-dimensional model acquired with the three-dimensional imaging device.

13. The method of claim 12 further comprising the step of assigning a color value to a plurality of voxels of the three-dimensional model, the color value corresponding to the quality point, and displaying the plurality of voxels in their assigned colors.

14. The method of claim 13, wherein the plurality of voxels define at least a portion of a reconstructed image.

15. A method for indicating voxel resolution quality comprising the steps of:

measuring a distance from the three-dimensional scanning device to an area of a subject corresponding to at least one image voxel;

measuring an angle between a line of sight of the three-dimensional imaging device and an orthogonal ray of the area of the subject corresponding to the at least one voxel;

comparing the measured distance to a known acceptable operating distance range of the three-dimensional scanning device;

comparing the measured angle to a known acceptable operating angle range of the three-dimensional scanning device;

plotting a quality point on a set of axes, wherein the axes are normalized such that a zero value is optimal, and a maximum acceptable value is 1 and a minimum acceptable value is −1, and wherein at least one color is assigned to each axis of the set of axes, each color defining a linear gradient spanning from an origin to maximum or minimum limits of each quadrant, and wherein each gradient is such that each point in a space defined by the set of axes has a unique color value; and displaying the quality point and the axes on a display screen of the three-dimensional scanning device, wherein the quality point is displayed in real time.

16. The method of claim 15 further comprising the step of assigning a quality point to each voxel of a three-dimensional model acquired with the three-dimensional imaging device.

17. The method of claim 16 further comprising the step of assigning a color value to a plurality of voxels of the three-dimensional model, the color value corresponding to the quality point, and displaying the plurality of voxels in their assigned colors.

18. The method of claim 17, wherein the plurality of voxels define at least a portion of a reconstructed image.

19. A method for indicating voxel resolution quality comprising the steps of:

measuring a distance from the three-dimensional scanning device to an area of a subject corresponding to at least one image voxel;

measuring an angle between a line of sight of the three-dimensional imaging device and an orthogonal ray of the area of the subject corresponding to the at least one voxel;

comparing the measured distance to a known acceptable operating distance range of the three-dimensional scanning device;

comparing the measured angle to a known acceptable operating angle range of the three-dimensional scanning device;

plotting a quality point on a set of axes;

assigning a quality point to each voxel of a three-dimensional model acquired with the three-dimensional imaging device; and assigning a color value to a plurality of voxels of the three-dimensional model, the color value corresponding to the quality point, and displaying the plurality of voxels in their assigned colors, wherein the plurality of voxels define at least a portion of a reconstructed image.

* * * * *